United States Patent [19]
Pixton

[11] Patent Number: 5,129,175
[45] Date of Patent: * Jul. 14, 1992

[54] FISHING LURE APPARATUS

[76] Inventor: Dennis N. Pixton, 604 SW. 80th Ter., North Lauderdale, Fla. 33068

[*] Notice: The portion of the term of this patent subsequent to Jun. 25, 2008 has been disclaimed.

[21] Appl. No.: 712,053

[22] Filed: Jun. 7, 1991

Related U.S. Application Data

[63] Continuation-in-part of Ser. No. 462,774, Jan. 10, 1990, Pat. No. 5,025,586.

[51] Int. Cl.⁵ .................................... A01K 85/00
[52] U.S. Cl. .................. 43/42.39; 43/42.24; 43/42.36
[58] Field of Search ............ 43/42.24, 42.36, 42.39, 43/44.9, 44.91, 44.92, 42.31

[56] References Cited

U.S. PATENT DOCUMENTS

| | | | |
|---|---|---|---|
| 2,190,449 | 6/1938 | Goldammer | 43/46 |
| 2,261,549 | 4/1938 | Hayes | 43/42 |
| 2,316,048 | 10/1941 | Clarke | 43/40 |
| 3,108,390 | 5/1962 | Knight | 43/42.09 |
| 3,758,976 | 9/1973 | Szwolkon | 43/42.24 |
| 3,854,233 | 12/1974 | Browning, III | 43/42.31 |
| 3,978,606 | 9/1976 | Riggs | 43/42.24 |
| 4,054,004 | 10/1977 | Schott | 43/42.31 |
| 4,208,822 | 6/1980 | Bryant | 43/42.02 |
| 4,211,027 | 7/1980 | Viscardi | 43/42.24 |
| 4,244,133 | 1/1981 | Martinek | 43/42.25 |
| 4,649,663 | 3/1987 | Strickland | 43/44.9 |
| 4,653,212 | 3/1987 | Pixton | 43/4.5 |
| 4,744,167 | 5/1988 | Steele | 43/42.06 |
| 4,790,101 | 12/1988 | Craddock | 43/42.37 |
| 4,791,749 | 12/1988 | Stazo | 43/42.29 |
| 4,918,854 | 4/1990 | Webre, Jr. | 43/42.31 |
| 4,969,287 | 11/1990 | Johnson | 43/42.31 |

*Primary Examiner*—Kurt Rowan
*Assistant Examiner*—Chuck Y. Mah
*Attorney, Agent, or Firm*—Richard M. Saccocio

[57] ABSTRACT

A weight arrangement is disclosed in conjunction with a Texas rig fishing lure whereby the fishing line from the eyelet of the fishing hook and which extends through the weighted portion of the fishing lure is not interfered with by the apparatus which is used to attach the weight portion to the body of the fishing lure. A helical coil member in conjunction with a small diameter tube member located therewithin prevents entanglement of the fishing line when the weight member is attached to the fishing lure.

19 Claims, 2 Drawing Sheets

FISHING LURE APPARATUS

CROSS REFERENCE TO RELATED APPLICATIONS

This application is a continuation-in-part of parent application Ser. No. 07/462,774, filed Jan. 10, 1990, which application will issue on Jun. 25, 1991, as U.S. Pat. No. 5,025,586, by Dennis N. Pixton, entitled "Fishing Lure Apparatus."

BACKGROUND OF THE INVENTION

1. Field of the Invention

This invention relates in general to a fishing lure attachable to a fishing line, and in particular to a fishing lure comprising a plastic worm having a fishing hook attached thereto with a weight attached to the front of the worm which lure is primarily adapted for bass fishing.

2. Description of the Prior Art

Bass fishing is a specialty unto itself within the broad fishing category of artificial worm fishing using a pole and reel. Within the technique of bass fishing, is a category wherein the fisherman casts a lure to a particular spot within a body of water with the lure descending substantially straight downward by means of a weight attached to the lure. Once the lure hits bottom, the fisherman then jigs the line so that the lure moves in a way that it simulates the movement of a live worm. This type of bass fishing is very popular among bass fisherman who apparently have had relatively good success with the technique.

The rig most generally associated with bass fishing comprises the attachment of a plastic worm in a manner which is commonly known as "a Texas rig," including variations thereof. In this type of rig, the fishing hook having a fishing line attached thereto is embedded into and through the front portion of a plastic worm such that the eyelet of the hook remains embedded within the plastic worm approximately three-quarters of an inch from the head of the lure. Then the hook is extended to the rear of the worm where its pointed end is embedded within the body of the plastic worm. Finally, the Texas rig is completed by utilizing a lead weight in the front of the lure so that when it is cast, the lure descends toward the bottom of the body of water. The lead weight may be fixedly attached to the line a distance away from the head of the worm; or, the lead weight may be fixedly attached to the line at the location of the head of the worm; or, the lead weight may be slidingly attached to the line 30, that is, it may move along the length of the line in the general vicinity of the head of the worm.

Because of the desire during bass fishing to have the lure freely pass through the aquatic vegetation, a bullet-shaped lead weight having a hole through the center axis thereof if most commonly used. In practice, the bullet-shaped weight is attached to the line or to the eyelet of the hook. Where the weight is attached to the line, a thin elongated member, such as a part of a toothpick or a part of a rubber band, is used to wedge the fishing line against the interior of a hole through the central axis of the lead weight. With the advent of a bullet-shaped weight having a helical attaching means attached thereto as shown and explained in my U.S. Pat. No. 4,653,212, issued Mar. 31, 1987, entitled "Artificial Fishing Lure and Method of Use," it became desirable to use this type of weight and attaching means instead of using the toothpick or rubber bank to secure the weight to the fishing line.

Accordingly, it is an object of the present invention to provide apparatus comprising a fishing lure whereby a lead weight may be attached to a plastic worm rigged as a Texas rig and whereby the line extending through the front portion of the worm and the weight does not get entangled with the attaching member.

Another object of the present invention is to provide a fishing lure rigged as a Texas rig whereby the fishing line extending within and through the body of the plastic fishing worm and the lead weight extends in a straight line therethrough.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention accomplishes the above-stated objectives as well as others, by providing a fishing lure which is rigged as a Texas rig having a plastic worm and a lead weight attached thereto with the fishing line extending in a straight direction from the eyelet of the hook through and out of the lead weight in front of the fishing worm and thence to the pole and reel.

In the present invention, the lead weight to be attached to the front portion of a plastic fishing worm includes an attachment member comprising an expanded helical coil made from wire attached to and extending from the lead weight with a plastic tube positioned with the helical coil. The helical coil attaching member further extends through and within a hole in the lead weight. According to the present invention, when assembling the lead weight to a plastic worm having a hook embedded therewithin in the manner of a Texas rig, the free end of the line is threaded through the opening through the plastic tube so that when the lead weight is attached to the plastic worm, the fishing line does not get entangled upon the means to secure the lead weight to the plastic fishing worm. And, the fishing line extends from the eyelet of the hook through the plastic fishing worm and through the lead weight and out therefrom in a straight line.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

Figure 1:
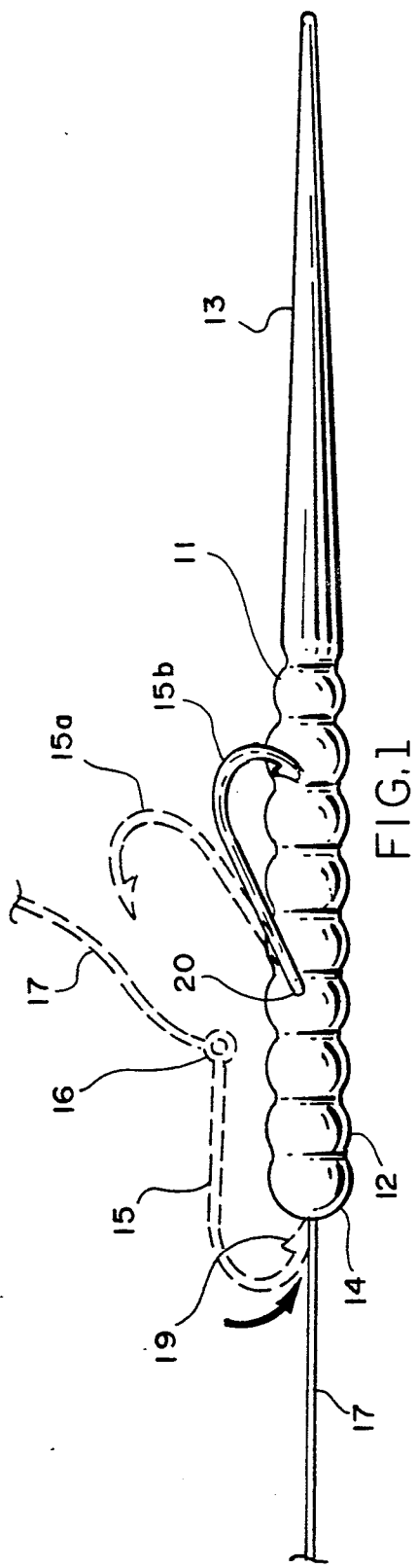
FIG. 1 illustrates the sequential rigging of a plastic worm in a Texas rig manner.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

Figure 2:
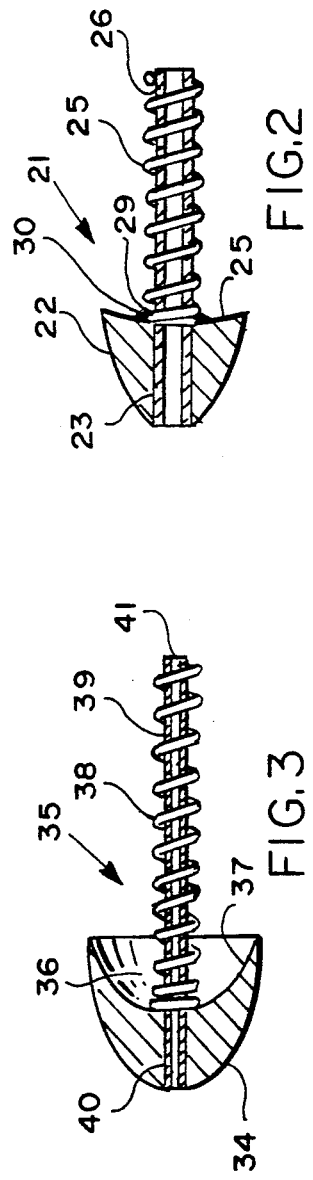
FIG. 2 illustrates in an enlarged cross section a lead weight to be attached to a fishing lure in combination with securement apparatus and means to prevent entanglement of a line within the plastic fishing worm.

Referring now to FIGS. 1 and 2 of the drawings, there is shown therein the present invention comprising an improved Texas rig arrangement of a hook 15, plastic worm 11, and lead weight 21. A plastic worm 11 may comprise any one of the large variety of different colors or styles of worms that are presently available at the retail market. Typically, the worm includes a body portion 12 and a tail portion 13 with the body portion comprising an elongated substantially cylindrical portion which is quite flexible while the tail 13 portion comprises a relatively flat and elongated piece of the same flexible plastic. Hook 15 includes an eyelet 16 at one end thereof and a sharp barbed point 19 on the other end. In rigging the plastic worm 11 in a Texas rig arrangement, a fishing line 17 is securely attached to the eyelet portion 16 of hook 15, then hook 15 is placed in relation to worm 11 such that the barbed end portion 19 is placed against the center of end face 14 of worm 11. The hook 15 is then pushed into the body of the plastic worm such that the hook end 19 passes through the central axis of the worm 13 at the front portion thereof and exits through an opening 20 created by the sharp barbed point 19 of fishing hook 15. The fishing hook 15 is then pulled out through the aperture 20, but such that the eyelet end 16 of hook 15 remains embedded within the front portion 12 of the body of fishing worm 11. The configuration of hook 15 at this point in time in the rigging of the Texas rig is shown by item 15A in FIG. 1. Hook 15 is then grasped by the shank thereof, rotated approximately 180°, and the pointed barbed end 19 is embedded with the body of the worm toward the tail 13 thereof. Hook 15 is then located as represented by 15B of FIG. 1. It is to be noted that the fishing line 17, at this time, extends from the eyelet 16 of hook 15 through the front portion of the body 12 of worm 11 and emanates from the center of end face 14 as shown in FIG. 1 of the drawings.

In accordance with the present invention, a weighted end piece 21 is provided and is to be attached to the front portion 12 of the body of worm 11. Weight member 21 comprises a tip portion 22 having a shape similar to that of the end of a bullet that is having a outer surface which extends from a rounded tip thereof backward in a divergingly convex configuration which terminates at the concave end 28 thereof as shown in FIG. 2. A hole 23 is provided through the central axis of end portion 22 of weight 21. A helical member 25 is fixedly attached at one end 29 thereof to an elongated small diameter plastic tube 26. The plastic tube 26 extends through the opening within helical member 25 and through the opening 23 in end piece 22. Plastic tubing 26 is fixedly secured within opening 23 such as by gluing. End 29 of helical member 25 is of a reduced cross-sectional diameter so as to fixedly secure helical member 25 to plastic tube 26. End 28 of end piece 22 may thereafter be filled with a waterproof glue 30 so as to further fixedly secure helical member 25 to lead weight 21.

Figure 3:
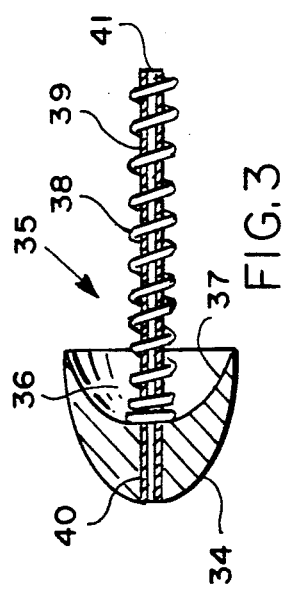
FIG. 3 illustrates another embodiment of connecting the attaching means to the lead weight.

FIG. 3 illustrates an alternative embodiment of attaching helical member and tube member 26 to a bullet-shaped lead weight member 35. In this embodiment, the lead weight end piece 34 includes a cylindrical boss 36 integrally formed with the concave end surface 37. A helically coiled wire member 38 is attached to boss 36 by utilizing the thread-like arrangement of the helical coils of member 38 to attach it to the cylindrical outer surface of boss 36. Once attached to boss 36, helical member 38 is maintained in position thereon by a force fit created by the larger external diameter of boss 36 compared to the smaller internal diameter of helical coil member 38. In this manner, helical member 38 is, in effect, threaded onto boss 36 and extends outward from the back end 37 of weight member 35 along its central axis. An elongated small diameter tube member 39 is press fitted at one end through the opening 40 of weight member 35 and extends through and out of helical coil member 38 at its other end.

Figure 4:
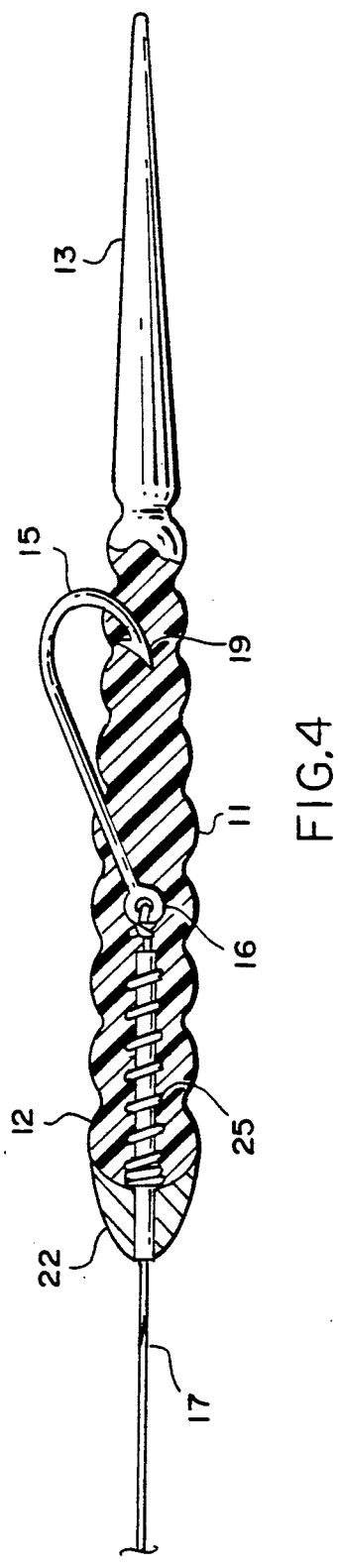
FIG. 4 illustrates in cross section a fully assembled plastic worm with a lead weight attached to the front thereof in a Texas rig arrangement.

FIG. 4 illustrates the connecting arrangement of the lead weight 21 or 31 to plastic worm 11 as well as hook member 15 and line 17 within the body of worm 11. After the worm 11 and hook 15 are rigged in a Texas rig fashion as per FIG. 1 of the drawings, the free end of fishing line 17 is threaded into and through and out of the opening 27 or 40 in small diameter tube member 26. As can be seen, due to the arrangement of tube member 26 or 39 within helical coil member 25 or 38, the fishing line 17 within the body of worm 11 must necessarily pass through the opening 27 or 41 within tube member 26 or 39. In so doing, the line 17 is prevented from becoming engaged or entangled with helical coil member 25 or 38 which is used to attach the plastic worm 11 to the weighted tip 21. Furthermore, it may be seen that line 17 extending from eyelet 26 to and through the opening 23 or 40 in tip portion 22 or 35, respectively, is in a straight line so that when a fish, such as a wide-mouth bass, engages the fishing lure and is hooked by the pointed end 19 of hook 15 there will be a direct pull from the hook 15 through line 17 to the fishing rod and reel being held by the fisherman without any indirectness due to slack in the fishing line 17. This positive and direct connecting of the fishing lure to the fishing pole, in a straight line and without any entanglement therebetween further provides for a very sensitive feel, enabling the fisherman to know when to set the hook to ensnare a fish.

Figure 5:
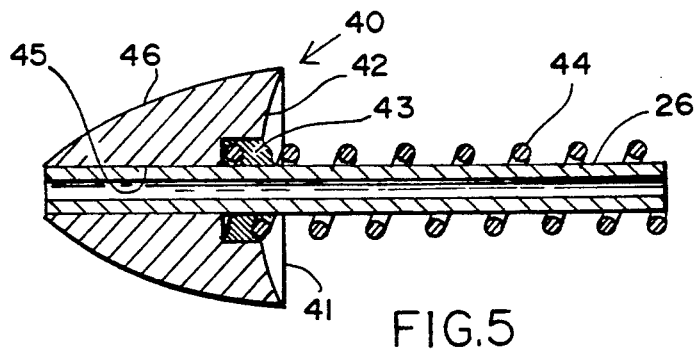
FIG. 5 is another embodiment of the connection of the attaching means to the lead weight.

FIG. 5 illustrates a further embodiment of the connection of the attaching member 44, which again may comprise a helically coiled wire member to a weight member 46. The outside shape of the weight member 46 is similar to that of weight member 22 of the embodiment of FIG. 2 and may either be straight tapered, convexly tapered, or even slightly concavely tapered.

The back surface of weight member 46 may be substantially flat 41 or slightly concave as shown by dashed line 42. Through hole 45 allows for the fitting of tube member 26 through weight member 46. Tube member 26 may be frictionally held within hole 45 of weight member 46. Other conventional methods of fixedly securing tube member 26 within weight member 46 may also be used.

A counterbored hole 43 at the enlarged end of weight member 46 provides for the attachment of attaching member 44 to weight member 46. The diameter of counterbore 43 may be substantially the same or slightly smaller than the outer diameter of attaching member 44 so as to provide a friction fit between attaching member 44 and weight member 46. Also, or in the alternative, a small amount of glue 47 may be applied within the cavity formed by counterbore 43 to secure attaching member 44 to weight member 46.

Figure 6:
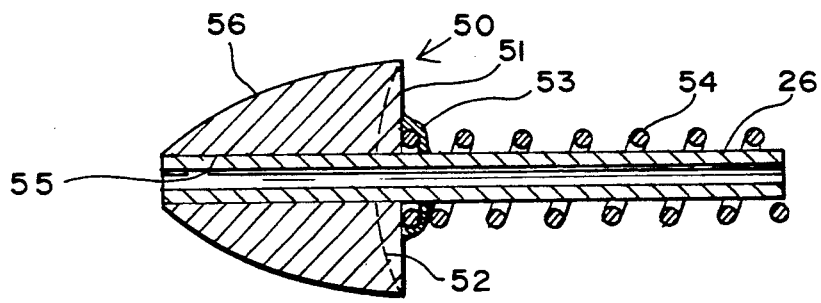
FIG. 6 is yet another embodiment of the connection of the attaching means to the lead weight.

FIG. 6 illustrates yet another embodiment of the connection of attaching member 54 to a weight member 56. Again, weight member 56 may have a divergingly convex outer shape with a slightly concave 52 or substantially flat 51 back face at the enlarged end thereof. The attachment of tube member 26 within hole 55 of weight member 56 may be the same as that of the embodiment of FIG. 5, that is, a friction or other conventional fit. In this embodiment, attaching member 54 is simply glued 53 to the enlarged back face 51 or 52 of weight member 56 and to tube member 26. This embodiment differs from that of FIG. 2 in that all the coils of attaching member 54 are of the same size.

Figure 7:
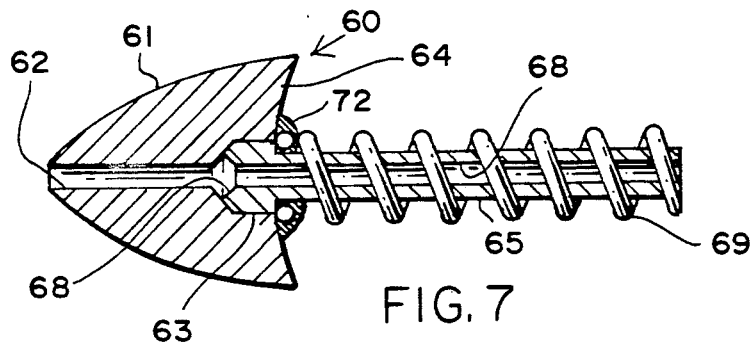
FIG. 7 is another embodiment of the connection attaching means to the lead weight.
Figure 8:
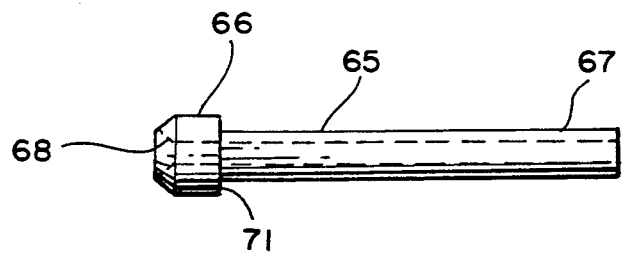
FIG. 8 is a detail plan view of the tubular member which extends from the enlarged end of the weight of the embodiment of FIG. 7.

The embodiment of the weight apparatus 60 to be used with a flexible fishing lure shown in FIGS. 7 and 8 is slightly different from the above-described embodiments. Weight member 61 includes a through bore 62 and a counterbore 63, the latter being at the enlarged back face 64 of weight member 61. Tube member 65 includes a head portion 66 and an extending shank portion 67 with a bore 68 through the full length thereof. Head portion 66 is fixedly secured within counterbore 63 with shank portion 67 extending outward. A countersink 68 in the head portion 66 provides for the easy insertion of a fishing line through bore 62 in weight member 61 and into and through bore 68 in tube member 65. A helical attaching member 69 extends around the outer surface of shank portion 67 and butts up against the intersecting surface 71 between head portion 66 and shank portion 67. A spot of glue 72 may be used to secure attaching member 69 to weight apparatus 60.

Figure 9:
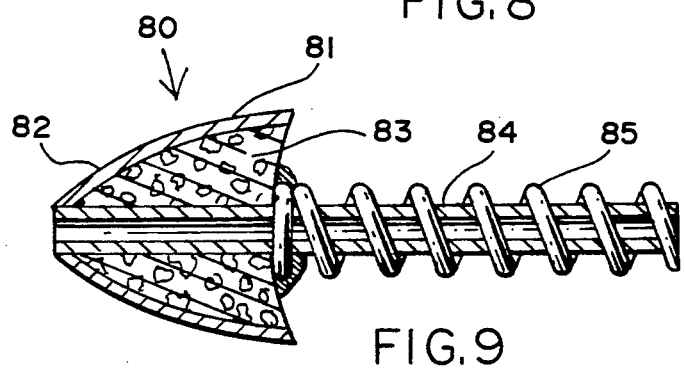
FIG. 9 is a cross-sectional view of a weight member having a jacket therearound with a composite core.

The embodiment of weight apparatus 80 of FIG. 9 includes a weight member 81 having a jacket or casing 82 around the tapered portion of weight member 81. The core 83 of weight member 81 may be made from a composite of many different dense materials, such as epoxy and steel particles or from a single material such as zinc. This type of weight member 81 would not employ lead and, therefore, would not cause any lead pollution of waters wherein the weight apparatus would be used. The jacket 82 may be made from plastic and have the desirable advantage of being impregnated with any of a variety of colors to provide a colored weight apparatus for a flexible fishing lure. The method of attaching tube member 84 and attaching member 85 to weight member 81 may be in accordance with any of the variations described above or consistent with the teachings of the present invention.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the scope of the breadth and scope of the claims here appended.

I claim as my invention:

1. Weight apparatus of a type to be used with a flexible fishing lure attached to a fishing line and hook comprising:
   a tapered weight member having a tapered outer shape and a concave back surface, an opening axially through said tapered weight member and an axial counterbore at the concave back surface;
   lure attaching means fitted at one end within said counterbore and having a second end extending from said counterbore, said attaching means comprising a helical coil member;
   tube means fitting within said axial hole in said tapered weight member and extending through said attaching member; and
   said tube means extending within said helical coil member for preventing a fishing line and a hook from becoming entangled with said helical coil member.

2. The weight apparatus of claim 1, including glue within said counterbore for securing said helical coil member to said tapered weight member.

3. The apparatus of claim 1, wherein said tube member has an opening therethrough along the longitudinal axis thereof.

4. The apparatus of claim 1, wherein said helical coil member is frictionally held within said counterbore in said tapered weight member.

5. The apparatus of claim 1, wherein said tube member is frictionally held within said tapered weight member.

6. Weight apparatus of a type to be used with a flexible fishing lure attached to a fishing line and hook comprising:
   a weight member having a tapered outer shape and a concave back surface, an opening axially through said weight member;
   lure attaching means comprising a helical coil member attached to said back surface of said weight member and extending away therefrom;
   tube means fitting within said axial opening in said weight member and extending away from said back surface and within said helical coil member; and
   said tube means extending within said helical coil member for preventing a fishing line and a hook from becoming entangled with said helical coil member.

7. The weight apparatus of claim 6, wherein said helical coil member is glued to said back surface of said weight member.

8. The weight apparatus of claim 7, wherein said helical coil member is glued at one end to said tube member at the back surface of said weight member.

9. The weight apparatus of claim 6, wherein said tube member is press fitted within said weight member.

10. Weight apparatus of a type to be used with a fishing lure comprising:
    a tapered weight member having one end pointed and a concave opposite end and an opening axially through said weight member;

tube means axially aligned with said opening through said weight member and extending from said concave end;

a helical coil member attached at one end to said tube means and extending axially from said concave end of said weight member; and said tube means extending within said helical coil member for preventing a fishing line and a hook from becoming entangled with said helical coil member.

11. Weight apparatus of a type to be used with a flexible fishing lure attached to a fishing line and hook, comprising:

a weight member having a tapered outer shape with a concave back surface, an opening axially through said weight member, an axial counterbore at the concave back surface;

tube means having a first axial portion having a first outer diameter and a second axial portion having a second outer diameter, an axial hole through said tube means, said first axial portion having said first outer diameter fitting within said counterbore in said weight member and said second axial portion extending away from said concave back surface of said weight member;

lure attaching means comprising a helical coil member fitting over said second axial portion of said tube means and attached at one end to said concave back surface of said weight member; and said tube means extending within said helical coil member for preventing a fishing line and a hook from becoming entangled with said helical coil member.

12. The weight apparatus of claim 11, wherein said tube means is frictionally held within said weight member.

13. The weight apparatus of claim 11, wherein said tube means is glued within said weight member.

14. The weight apparatus of claim 11, wherein said helical coil member is glued to said concave back surface of said weight member.

15. The weight apparatus of claim 11, wherein said helical coil member is glued at said one end to said tube means.

16. The weight apparatus of a type to be used with a flexible fishing lure attached to a fishing line and hook, comprising:

a weight member having a tapered outer shape and a concave back surface, an opening axially through said weight member;

tube means fitting within said axial opening and extending away from said back surface;

lure attaching means comprising a helical coil member fitting around said tube means and extending along therewith from said back surface, said helical coil member being attached at one end to said back surface of said weight member;

said weight member comprising an outer casing with a hollow interior, said hollow interior being filled with dense material; and said tube means extending within said helical coil member for preventing a fishing line and a hook from becoming entangled with said helical coil member.

17. The weight apparatus of claim 16, wherein said helical coil member is attached to said tube means at said one end.

18. The weight apparatus of claim 16, wherein said casing is filled with a mixture of epoxy and steel particles.

19. The weight apparatus of claim 16, wherein said casing is filled with zinc.

* * * * *